United States Patent [19]
Savage et al.

[11] Patent Number: 5,715,465
[45] Date of Patent: Feb. 3, 1998

[54] POWER SUPPLY CONTROL APPARATUS USING LAST POWER STATE MEMORY

[75] Inventors: Jeff Savage; Alan E. Brown, both of Austin, Tex.

[73] Assignee: Dell USA, L.P., Round Rock, Tex.

[21] Appl. No.: 563,909

[22] Filed: Nov. 22, 1995

Related U.S. Application Data

[63] Continuation of Ser. No. 235,822, Apr. 29, 1994, abandoned.

[51] Int. Cl.$^6$ .................................................... G06F 1/26
[52] U.S. Cl. ............................................ 395/750; 365/228
[58] Field of Search ............................ 395/750; 307/113, 307/246; 364/707; 365/229, 228

[56] References Cited

U.S. PATENT DOCUMENTS

| | | | |
|---|---|---|---|
| 4,288,865 | 9/1981 | Graham | 365/229 |
| 4,698,748 | 10/1987 | Juzswik et al. | 395/750 |
| 5,138,186 | 8/1992 | Dumbovic | 307/246 |
| 5,239,495 | 8/1993 | Nanno et al. | 364/707 |
| 5,384,491 | 1/1995 | Suizu | 307/113 |

*Primary Examiner*—Jack B. Harvey
*Assistant Examiner*—Jeffrey K. Seto
*Attorney, Agent, or Firm*—Skjerven, Morrill, MacPherson, Franklin & Friel, L.L.P.; Stephen A. Terrile

[57] ABSTRACT

A last power state apparatus including a power supply controller having a battery-backed memory bit for retaining the power state of an electronic device during a failure of a primary power source. The battery is preferably a lithium type battery and the power supply preferably provides a flea power signal when primary power is available to maintain the state of the memory bit even if the power supply is off. The controller asserts a power status signal to the power supply based on the state of the memory bit, so that the power supply remains off or powers up as appropriate when primary power is next available. A momentary power switch is used to manually turn on and off the power supply and the electronic device by toggling the memory bit. The electronic device, which is typically a computer system, provides signals to the power supply controller to turn off the device. Further, the computer can enable an interrupt to prevent the user from turning off the device until after vital functions are completed. Also, other events, such as a real time clock (RTC) alarm, or the activation of a modem are monitored to toggle the memory bit to turn on the device. The RTC also monitors the battery voltage and provides a standard battery valid signal, where the controller resets the memory bit to a default off state if the battery voltage falls below a predetermined minimum value.

29 Claims, 6 Drawing Sheets

POWER SUPPLY CONTROL APPARATUS USING LAST POWER STATE MEMORY

This is a Continuation of application Ser. No. 08/235,822 filed Apr. 29, 1994 now abandoned.

FIELD OF THE INVENTION

The present invention relates to a battery backed memory for determining the last power state of a power supply.

DESCRIPTION OF THE RELATED ART

Electronic devices such as computer systems typically use a two-state toggle switch for turning the device on or off. A two-state toggle switch mechanically switches to its other state after being pressed or asserted, so that it must be pressed again to return it to its first state. One problem with a toggle type power switch is that it almost invariably electrically removes AC power from the power supply to turn off the device. In many cases it is desirable, however, to provide a means of turning on and off the electronic device indirectly upon the occurrence of events other than the assertion of the power switch. For example, it is desirable to turn on or wake up a computer system when a modem is activated upon receipt of an external call or upon the receipt of an alarm signal. Also, it may be desirable to power down a computer system through software. If it desired to indirectly turn on and off an electronic device, it is not practical to use a toggle switch because it would have to be mechanically manipulated to change its state.

A momentary power switch has been used on some electronic devices and is an alternative to a toggle type power switch in applications where an indirect power switch is desired. Unlike a toggle switch, which changes mechanical state when it is toggled, a momentary switch is spring loaded and changes state only while being pressed, and then returns to its original state after being released. A momentary switch must be used in conjunction with logic to turn on and turn off the respective device. A momentary power switch is satisfactory in applications where it is inconsequential that the device remains off after a power failure or loss of AC power. If the user is not available, the device remains off, and if the user is available, the user can turn the device back on if desired. However, the use of a momentary switch is undesirable in other applications, such as a computer used as a file server, where it is desired that the computer automatically turn itself back on when the AC power is next available. Since the momentary switch does not change mechanical state, it does not "remember" its last state while power was provided. The logic used in conjunction with the momentary switch must be powered, so that it also loses its state if power is removed. Usually, the momentary switch and associated logic are designed to reset to a default off state once power is removed. Thus, if the computer system loses power, the computer system will remain off and has no way of detecting that the AC power is available again.

Therefore, an apparatus is desired which can remember the last power state of the power supply of an electronic device, such as a computer system, and which can also allow the device to resume its previous power state once AC power is next available.

SUMMARY OF THE INVENTION

An electronic device incorporating the last power state apparatus according to the present invention includes a battery backed memory which retains the last power state of the device in the event of a power failure. A battery, which is preferably a lithium or alkaline type battery, is used to maintain power to the memory bit. The device ultimately receives power from a primary power source, which is typically AC voltage from an AC outlet. A power supply converts the AC voltage to the appropriate voltage levels required by the electronic device. If a power failure occurs, a bit in the memory backed up by the battery is read and a power status signal is provided to the power supply to direct the power supply to either remain off or power up, as appropriate, when primary power is next available. Rather than using a toggle switch to electrically remove the primary power source from the power supply, the power supply includes circuitry which receives the power status signal and turns itself, and thus the electronic device, on and off accordingly. The power status signal is provided directly or indirectly from the memory bit, so that the state of the memory bit ultimately controls the power state of the electronic device. A switch circuit is connected to the memory bit and becomes a power switch, which is preferably a momentary switch. The switch circuit detects the assertion of the power switch and changes the state of the memory bit accordingly. In this manner, if the primary power source is temporarily interrupted, the power supply remains off or is powered up when primary power is next available based on the state of the memory bit.

In the preferred embodiment, the power supply includes a pulse width modulation (PWM) circuit, where the power supply receives the power status signal and enables or disables the PWM to turn itself on or off. Thus, the power supply is shut off by disabling the PWM rather than by mechanically removing the primary power source. Since the primary power is available even when the power supply is off, the power supply preferably provides a five volt "flea power" signal to the power supply controller, regardless of whether the power supply is on or off. In this manner, the five volt flea power signal provides power to the power supply controller and the memory bit even when the power supply is turned off, to avoid unnecessarily draining the battery. To achieve this, the five volt flea power is logically "ORed" with the battery voltage output. Also, the five volt output of the power supply could optionally be logically ORed with the flea power and the battery voltage output to provide power to the controller if the power supply is on and operating normally. The last power state apparatus according to the present invention is incorporated into a single power supply controller, which is preferably implemented in complementary-MOS (CMOS) for low power consumption to prevent significantly draining the battery while primary power is not available. The memory bit is preferably implemented with a flip-flop device within the power supply controller.

As known to those skilled in the art, a real time clock (RTC) preferably monitors the voltage of the battery and provides a standard battery valid signal, which is indicative of whether the battery voltage is above a predetermined low level. If the battery voltage is below that level, the battery voltage is considered insufficient and the memory bit is reset to a default off state, since the power status of the power supply is considered unknown.

In the preferred embodiment, various conditions may be monitored by the power supply controller for turning on and off the power supply. In a computer system, for example, several events could be monitored, such as activation of a modem, to wake up or otherwise turn on the computer system to perform necessary functions. Also, events could be monitored through software for determining whether to shut down the computer system. Furthermore, a safety mechanism can be provided and enabled to prevent a user from turning off the computer system while vital functions are being performed and are not yet completed. The computer system can be shut down normally after the vital functions are completed.

The last power state apparatus according to the present invention provides a way for an electronic device, such as a computer system, to remember the last power state of the device after main power is lost and then next available. In this manner, a momentary switch could be used to turn on and off the computer, so that other events could be used to power it up or down. This is particularly advantageous for a computer system performing server functions, where it is desired that the server system automatically power itself back up when main power is next available after a power failure. In this manner, an operator would not have to be available to reactivate the server system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
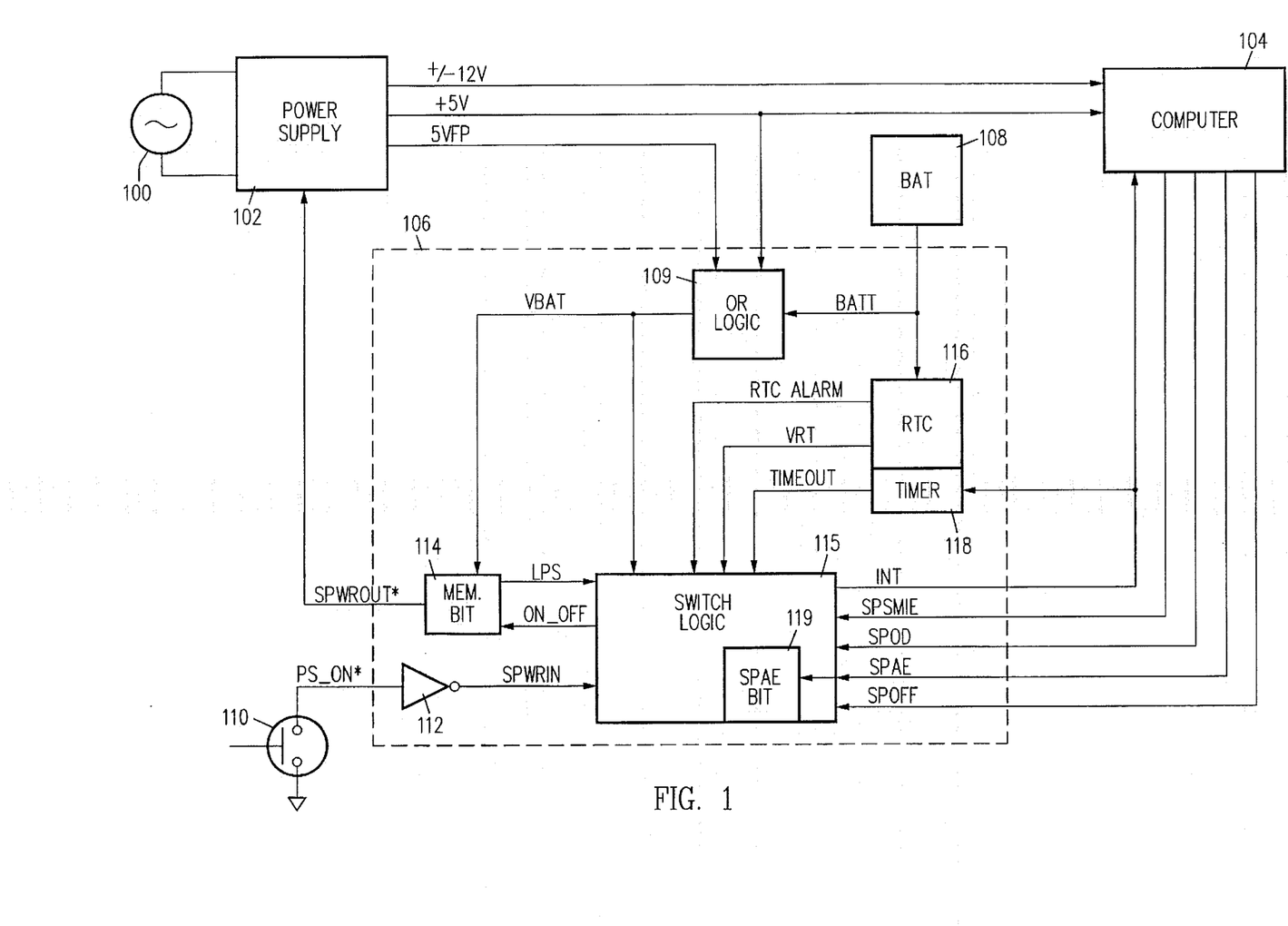
FIG. 1 is a simplified block diagram of a computer system incorporating a last power state apparatus according to the present invention.

Referring now to FIG. 1, a simplified block diagram is shown of a computer system incorporating the last power state apparatus according to the present invention. An AC source 100 is shown connected to a power supply 102 for providing power to a computer system 104. The AC source 100 is typically a wall outlet providing a voltage of 120 or 240 volts, depending upon the particular standards of the location where the computer 104 is being used. The AC source 100 serves as the primary power source for the computer 104, although other types of main power sources, including DC sources, are contemplated for use with the present invention. The power supply 102 converts the voltage from the AC source 100 to the various DC voltage levels required for use by the computer 104. In FIG. 1, for example, the power supply 102 provides +5V, +12V, and −12V power signals to the computer system 104, although it is understood that other voltages or other combinations of voltages could be used. Furthermore, the present invention is not limited to a computer system, but may be any other type of electronic device. Even though the AC source 100 is generally reliable, it is understood that power failures occur periodically, where the voltage provided by the AC source 100 is temporarily interrupted.

In the preferred embodiment, a power supply controller 106 is included for controlling the power supply 102. In the embodiment shown in FIG. 1, the power supply controller 106 is preferably the 9011 CMOS (Complimentary-MOS) chip manufactured by National Semiconductor, Inc., where all of the logic for controlling the power supply 102 is incorporated into the power supply controller 106. CMOS logic is preferably used to achieve low power consumption in the event of loss of voltage from the AC source 100. As known to those skilled in the art, a lithium or alkaline type battery 108 is included, which provides a signal BATT to the power supply controller 106. The BATT signal is preferably 3.3 volts. Furthermore, the power supply 102 is preferably implemented to provide a 5V flea power signal, referred to as 5VFP, to the power supply controller 106. The 5VFP signal is a low power 5V signal indicative of the AC source 100 being present and providing voltage, even when the power supply 102 is turned off. If the AC source 100 is disconnected or if a power out occurs so that the AC source 100 no longer supplies voltage, the 5VFP signal goes to 0 volts. In the preferred embodiment, OR logic 109 is provided within the power supply controller 106 for receiving the 5VFP, the 5V and the BATT signals and for providing a signal VBAT to power the power system controller 106.

The power supply controller 106 receives power from either the 5VFP signal, if available, or alternatively from the battery 108 through the BATT signal. Although the +5V signal is shown provided to the OR logic 109 from the power supply 102, this is an optional connection and is not necessary. In this manner, the power supply controller 106 is powered by the +5V signal when the power supply 102 is powered on and operating normally. If the power supply 102 is off, but the AC source 100 is supplying voltage so that the 5VFP signal is asserted, the power supply controller 106 receives power from the 5VFP signal. Otherwise, if the +5V and 5VFP signals are not provided, the power supply controller 106 receives power from the battery 108. In this manner, if the power supply 102 is on and a power out occurs, where the voltage provided from the AC source 100 is temporarily interrupted, the power supply controller 106 still receives power from the battery 108. During this temporary interruption of power, the memory bit 114 remains powered so that the LPS and SPWROUT* signals remain asserted. In this manner, when the voltage of the AC source 100 is next available, the power supply 102 will automatically be powered up to provide power to the computer 104.

The power supply controller 106 provides a power status signal SPWROUT* to the power supply 102. An asterisk (*) at the end of a signal name denotes negative logic, where the signal is considered asserted when low or at a logic 0 value, and is considered negated when high or at a logic 1 value. In this manner, the power supply 102 is turned on when the AC source 100 provides sufficient voltage and when the SPWROUT* signal is asserted low by the power supply controller 106. The power supply 102 is turned off when the SPWROUT* signal is negated high or upon failure of the AC source 100.

A single pole/single throw (SPST) normally open momentary switch 110 has one terminal connected to 5VFP and the other terminal providing a PS_ON* signal to the power controller 106, which is further connected to the input of an internal schmitt trigger inverter 112 of the power controller 106. The output of the inverter 112 provides a signal SPWRIN. Debounce logic (not shown) comprising resistors and capacitors would also be included, but is not shown for simplicity. The inverter 112 serves as a buffer to provide the SPWRIN signal. In operation, the user of the computer 104 may turn it on by turning on the power supply 102 by momentarily pressing the switch 110, which asserts the PS_ON* signal low, and the SPWRIN signal high. When the switch 110 is released by the user, the PS_ON signal is negated high, while the SPWRIN signal is correspondingly negated low. The power supply controller 106 includes a memory bit 114, which provides the SPWROUT* signal to the power supply 102 and also provides a last power state (LPS) bit to an internal switch circuit 115 of the power supply controller 106. The switch circuit 115 will further be described below.

The LPS signal is preferably the opposite logical value of the SPWROUT* signal, so that when the SPWROUT* signal is asserted low, the LPS signal is asserted high and vice-versa. The LPS signal is provided to the switch circuit 115 so that the switch circuit 115 can monitor the power state of the power supply 102 and the computer 104. The switch 115 circuit provides a signal ON_OFF to the memory bit 114 to toggle the state of the memory bit 114 and the LPS and SPWROUT* signals. The ON_OFF signal may comprise a plurality of signals depending upon the particular implementation of the memory bit 114. For example, the switch logic 115 may provide the input, preset and clear signals to a flip-flop, as known to those skilled in the art.

In the preferred embodiment, the power supply controller 106 includes a real time clock (RTC) 116 for performing RTC functions as known to those skilled in the art. Furthermore, the RTC 116 monitors the voltage of the BATT signal from the battery 108 to determine whether the battery 108 is providing sufficient voltage to the power supply controller 106. To this end, the RTC 116 asserts a standard valid signal VRT high when the voltage of the battery 108 is above a predetermined low level, but otherwise negates the VRT signal low. The power supply 106 preferably includes a timer 118 to perform timer functions associated with the power supply controller 106. The timer 118 receives clock signals from the RTC 116, and is initiated by the assertion of an interrupt signal INT, described below. Upon timeout of the timer 118, the timer 118 preferably asserts a signal TIMEOUT.

In the preferred embodiment, the computer 104 provides a series of signals to the power supply controller 106 to enable or disable certain power conditions, or to otherwise turn off the power supply 102 through software. These signals may be provided directly or encoded through the I/O (input/output) bus of the computer 104. An SPSMIE signal indicates whether a corresponding bit is set within the power supply controller 106, which serves to enable the INT signal to the computer 104 when the power supply 102 is on and the switch 110 is pressed to turn off the computer 104. An SPOD signal is programmed by the computer 104 to indicate whether a corresponding bit is set within the power supply controller 106. The SPOD signal indicates whether to allow the power supply 102 and the computer 104 to be shut down or turned off by the user asserting the switch 110. These functions will be described further below. An SPAE signal provided from the computer 104 causes a corresponding SPAE bit 119 to be set within the power supply controller 106, which indicates whether the power supply 102 and computer 104 should be turned on upon assertion of the RTC ALARM signal by the RTC 116. The SPAE bit 119 is a soft power alarm enable bit which allows a wakeup function. The SPAE bit 119 is optional and preferably powered by the VBAT signal, similar to the memory bit 114, to be valid while the power supply 102 is turned off. An SPOFF signal is programmed by the computer 104 when a corresponding bit is set within the power supply controller 106, which indicates that the power supply 102 is to be turned off.

Figure 2:
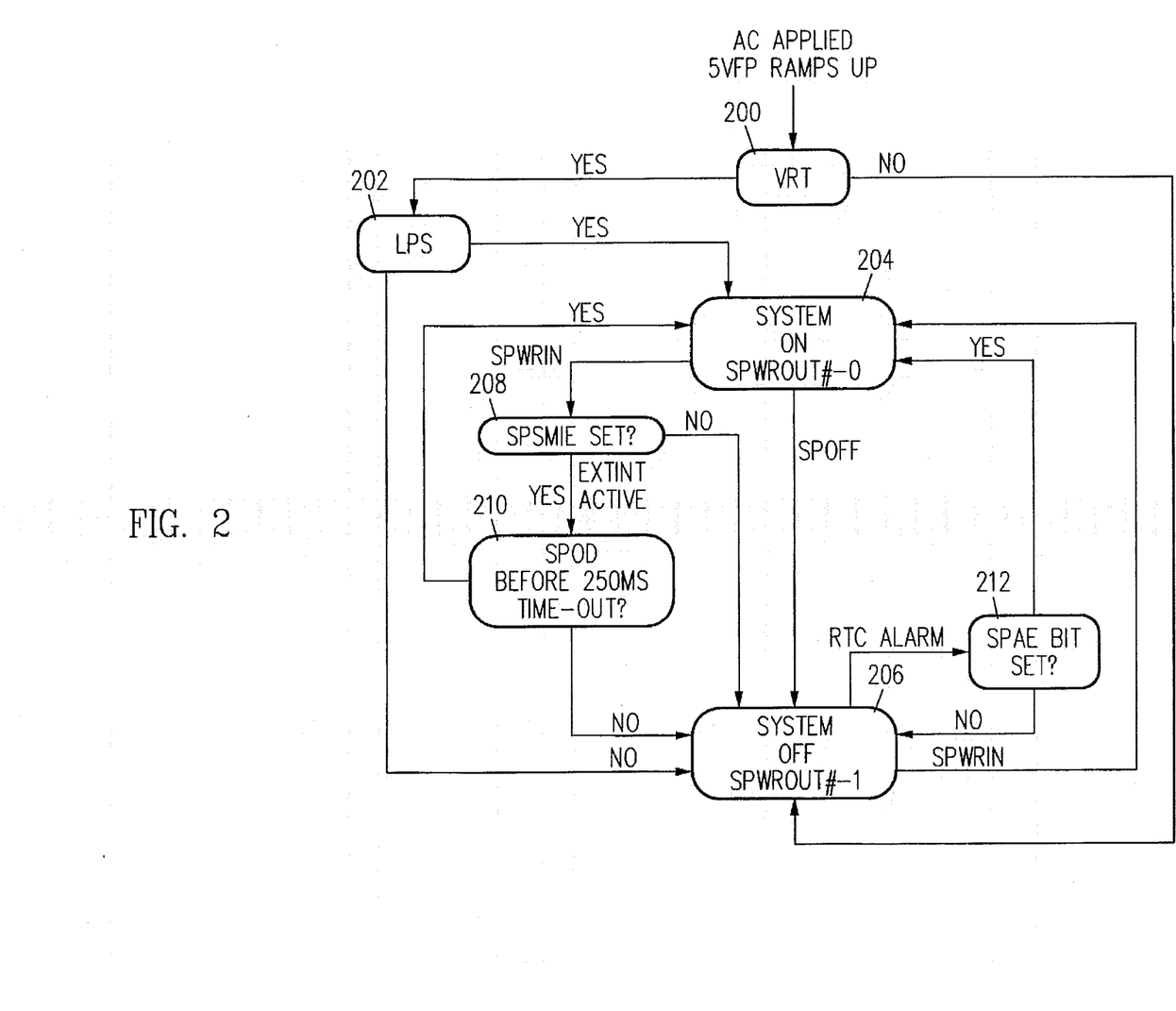
FIG. 2 is a flowchart diagram illustrating the operation of the logic of the power supply controller shown in FIG. 1.

Referring now to FIG. 2, a flowchart diagram is shown illustrating the operation of the switch circuit 115 within the power supply controller 106 of FIG. 1. Operation begins when voltage from the AC source 100 is next available, so that the power supply 102 begins providing the 5VFP signal. When this occurs, operation proceeds to a step 200, where the VRT signal is monitored. If the VRT signal is asserted, indicating the voltage of the battery 108 is sufficient, operation proceeds to a step 202, where the LPS signal is monitored to determine whether the power supply 102 should be turned on. If so, operation proceeds to a step 204, where the power supply 102 is turned on by setting the memory bit 114 to assert the SPWROUT* signal low. If the VRT signal is negated in step 200, or if the LPS signal is negated in step 202, operation proceeds to a step 206, where the power supply 102 is turned off by negating the SPWROUT* high. It is understood, however, that the flowchart is for illustration purposes only, since the power supply 102 will automatically be powered up or remain off when the voltage of the AC source 100 is next available, since the SPWROUT* signal does not change during the temporary power outage.

If the switch 110 is momentarily pressed so that the SPWRIN signal is asserted while in step 204, operation proceeds to a step 208, where the switch circuit 115 monitors the SPSMIE signal. If the SPSMIE signal is directed negated, operation immediately proceeds to step 206, where the SPWROUT* signal is negated high to shut off the power supply 102. Otherwise, if the SPSMIE signal is detected asserted in step 208, the INT signal is asserted to the computer 104, and operation proceeds to a step 210 to monitor the SPOD signal. The assertion of the INT signal triggers the timer 118. Operation remains in step 210 until the SPOD signal is asserted, or until the timer device 118 asserts the TIMEOUT signal. The timeout of the timer 118 is preferably set to approximately 250 milliseconds (ms) in the preferred embodiment, although the particular timeout period depends on the particular design. If the computer 104 asserts the SPOD signal before the timer 118 asserts the TIMEOUT signal, operation returns back to step 204, so that the power supply 102, and consequently the computer 104, remain on. If, however, the SPOD signal is not asserted before the TIMEOUT signal is asserted, operation proceeds to step 206, where the power supply controller 106 negates the SPWROUT* signal to turn off the power supply 102. Meanwhile, the computer 104 receives the INT signal and asserts the SPOD signal before the 250 ms timeout period to prevent the power supply 102 and the computer 104 from being shut down by the user in the event that vital operations are occurring and not completed to prevent loss of data or other undesirable results. If vital operations are occurring so that operation is returned back to step 204 from step 210, the user may eventually turn off the computer 104 by pressing the switch 110 after the vital operations are completed.

The computer 104 programs the SPOFF signal in the power supply controller 106 to turn off the power supply 102 and the computer 104 based on conditions typically determined by, or monitored through, software. However, other hardware conditions can cause the assertion of the SPOFF signal. In any event, if the SPOFF signal is set by the computer 104 while in step 204, operation proceeds to step 206 to shut down the system.

As known to those skilled in the art, the RTC 116 asserts the RTC ALARM signal under certain conditions, such as alarm time equals actual time. If the RTC ALARM signal is asserted while the power supply 102 and the computer 104 are shut off in step 206, operation proceeds to a step 212 to monitor the SPAE bit. If the SPAE bit is detected set in step 212, indicating that the wakeup function is, enabled, operation proceeds to step 204 where the power supply controller 106 asserts the SPWROUT* signal low to turn on the power supply 102. Otherwise, if the SPAE bit is detected not set in step 212, operation returns back to step 206, so that the power supply 102 remains off.

Figure 3:
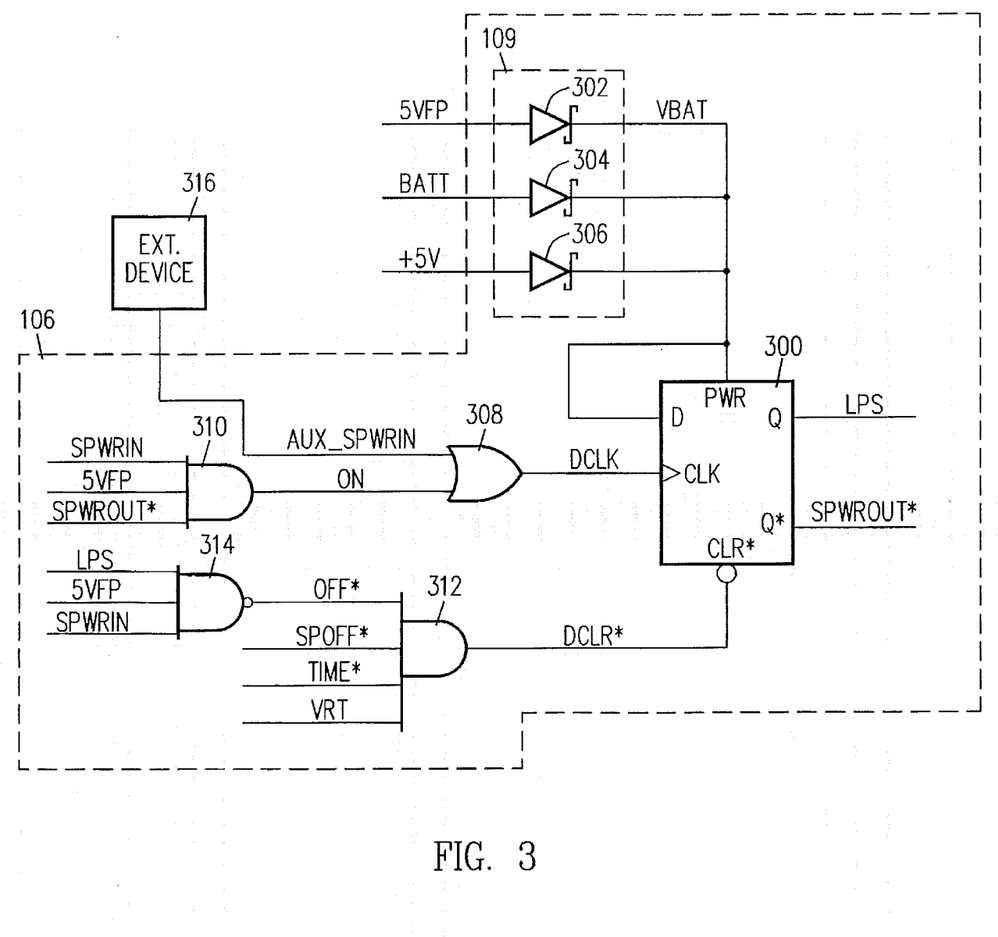
FIG. 3 is a schematic diagram of a portion of the logic of the power supply controller of FIG. 1 using a flip-flop to store the last power state bit.

Referring now to FIG. 3, a schematic diagram is shown illustrating an embodiment of certain portions of the power supply controller 106 of FIG. 1. In particular, the memory bit 114 shown in FIG. 1 is implemented with a D type flip-flop 300. The OR logic 109 comprises a series of Schottky diodes 302, 304 and 306. In particular, the 5VFP signal is provided to the anode of the Schottky diode 302, having its cathode providing a signal VBAT to the power and D inputs of the D flip-flop 300. Likewise, the BATT signal is connected to the anode of the Schottky diode 304 and the +5V signal is connected to anode of the diode 306, where the cathodes of the diodes 302, 304 and 306 are connected together to provide the VBAT signal. The +5V signal is not entirely necessary since the 5VFP signal is sufficient to provide power to the power supply controller 106. Nonetheless, if the +5V signal is provided, the diode 306 is forward bussed and the diodes 302 and 304 are reversed biased. However, if the power supply 102 is off and the +5V signal is not provided, and if the AC source 100 is providing voltage, the 5VFP signal is asserted, thereby forward biasing the diode 302 while the diodes 304 and 306 are reversed biased. As described above, the BATT signal is preferably approximately 3.3V so that the diode 304 remains turned off if either the +5V or 5VFP signals are provided. If, however, the voltage of the AC source 100 is not provided, the +5V and 5VFP signals are negated, reverse biasing the diodes 302 and 306, so that the BATT signal forward biases the diode 304 to provide power to the VBAT signal. In this manner, power is always provided to the power supply controller 106 and the D flip-flop 300 as long as battery 108 is supplying sufficient voltage.

Within the switch circuit 115, a signal AUX_SPWRIN is provided to one input of a two-input OR gate 308, having its other input connected to or receiving a signal ON from a three-input AND gate 310. The AUX_SPWRIN signal is typically asserted by some external device 316 to turn on the computer system 104, where the external device 316 is usually a modem, although other types of devices are contemplated. The output of the OR gate 308 provides a signal DCLK, which is connected to the clock input of the D flip-flop 300. When the DCLK signal is asserted high, the D flip-flop 300 is clocked and asserts the LPS signal high and the SPWROUT* signal low to turn on the power supply 102. Thus, if the AUX_SPWRIN or the ON signals are asserted while AC voltage is available, the power supply 102 is turned on. The ON signal generally represents the condition where the power supply 102 is off and the user presses the switch 110, asserting the SPWRIN signal high. Although simplified for purposes of illustration, the AND gate 310 receives the SPWRIN signal at a first input, the SPWROUT* signal at a second input and the 5VFP signal at a third input. Thus, while the SPWROUT* signal is negated high and the 5VFP and SPWRIN signals are asserted, the ON signal is asserted high, thereby clocking the D flip-flop 300.

Several logic conditions are also provided for clearing the D flip-flop 300. These functions are provided to one of the inputs of a 4-input AND gate 312, providing a signal DCLR* to the inverted clear input of the D flip-flop 300. Thus, anytime the DCLR* signal is asserted low, the D type flip-flop 300 is cleared, thereby turning off the power supply 102. It is noted that the DCLK and the DCLR* signals perform the functions of the ON_OFF signal of FIG. 1. One input of the AND gate 312 receives a signal OFF*, which is provided from the output of a three-input NAND gate 314. The first input of the NAND gate 164 receives the LPS signal, the second input receives the SPWRIN signal and the third input receives the 5VFP signal. In this manner, when the power supply 102 is on and the SPWRIN signal is asserted, the output of the NAND gate 314 is asserted low, thereby clearing the D flip-flop 300 to shut off the power supply 102. The 5VFP signal is provided to prevent clearing the D flip-flop 300 while the LPS signal is asserted during a temporary power failure. A second input to the AND gate 312 receives a signal SPOFF*, which is an inverted version of the SPOFF signal. Thus, if the SPOFF* signal is asserted low, the D flip-flop 300 is cleared to turn off the power supply 102. A signal TIME* is provided to the third input of the AND gate 312, where the TIME* signal is asserted low when the timer device 118 times out before the SPOD bit is asserted. Finally, the fourth input of the AND gate 312 receives the VRT signal, so that the D flip-flop 300 defaults to off when the BATT signal is too low, indicating that the voltage of the battery 108 is no longer sufficient.

Figure 4A:
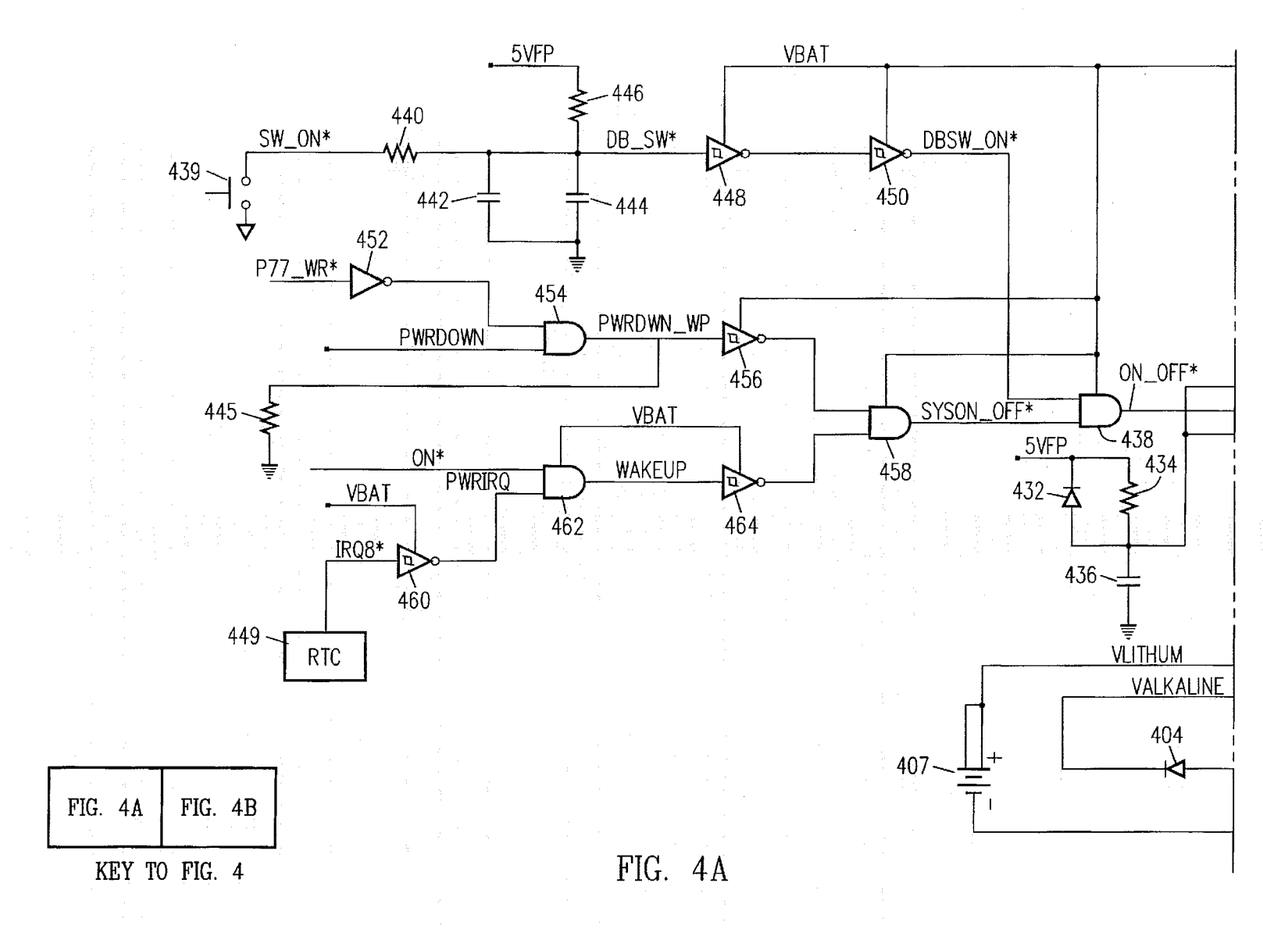
FIG. 4 is a schematic diagram of an alternative embodiment of the last power state apparatus according to the present invention using discrete logic.
Figure 4B:
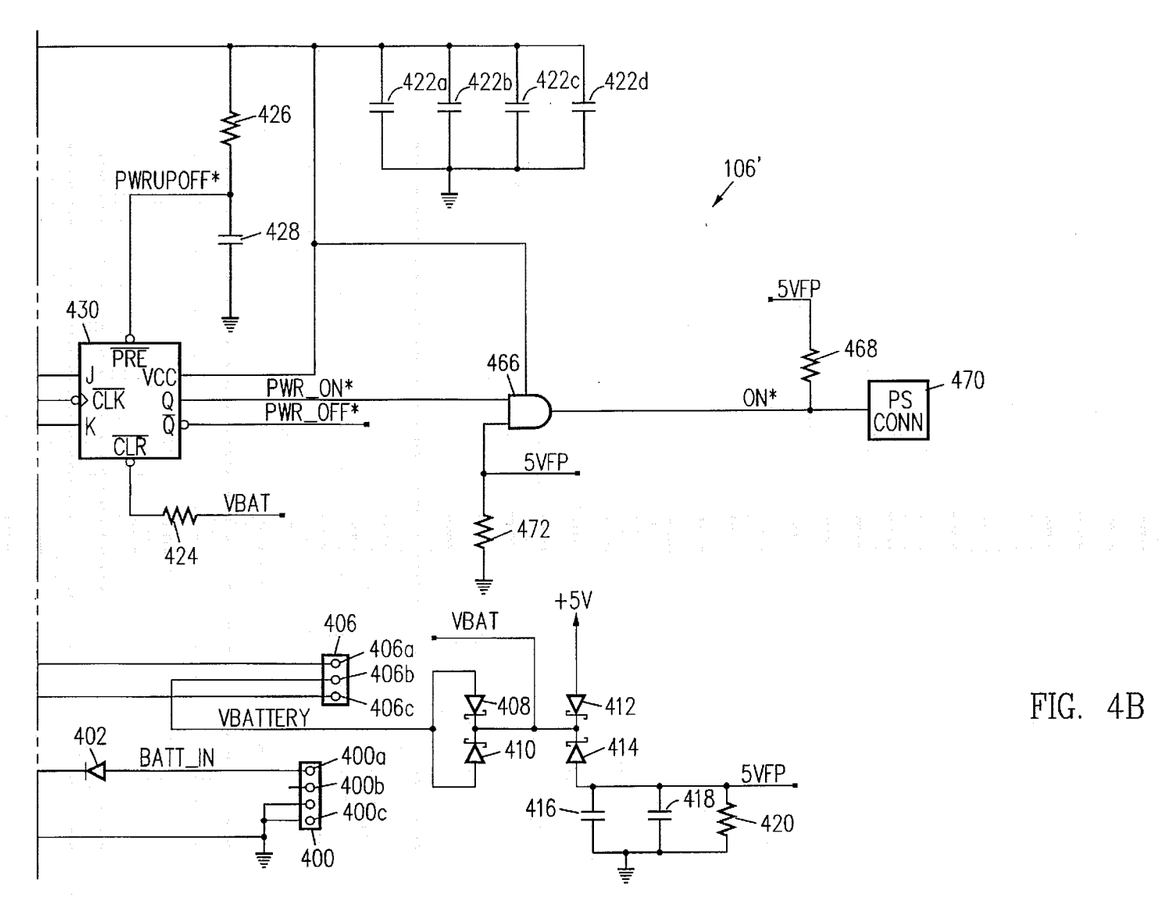

Referring now to FIG. 4, an alternative embodiment of the power supply controller 106 is shown, referred to as the power supply controller 106', which is implemented using discrete logic rather than a single chip. The power supply controller 106' is preferably coupled to the power supply 102 and the computer 104, with minor modifications as described below. In the preferred embodiment, most of the discrete logic devices shown in FIG. 4 are preferably CMOS type devices to reduce power consumption. An alkaline battery (not shown) is connected between terminals 400a and 400b and 400c of a connector 400, where the terminal 400a provides a signal BATT_IN and where the terminals 400b and 400c are preferably coupled to ground. The BATT_IN signal is connected to the anode of a diode 402, having its cathode connected to the anode of a diode 404, having its cathode providing a signal VALKALINE. The VALKALINE signal is provided to a terminal 406c of a connector 406. A lithium battery 407 has its negative terminal connected to ground, and its positive terminal providing a signal VLITHUM to a terminal 406a of the connector 406. A jumper may be provided between the terminal 406a and a terminal 406b of the connector 406 to connect the lithium battery 407 to provide a signal VBATTERY from the terminal 406b. Alternatively, the alkaline battery can provide the VBATTERY signal by providing a jumper between the terminals 406b and 406c of the connector 406. In either case, the VBATTERY signal is provided to the anodes of two Schottky diodes 408 and 410, having their cathodes connected together to provide the VBAT signal. The +5V signal from the power supply 102 is provided to the anode of a Schottky diode 412, and the 5VFP signal is provided to the anode of a Schottky diode 414, where the cathodes of the diodes 412 and 414 are connected together to also provide the VBAT signal.

The diodes 408, 410, 412 and 414 perform a similar function as the OR logic 109, so that the VBAT signal receives power from either the +5V, the 5VFP or the VBATTERY signals. The 5VFP signal is filtered by capacitors 416 and 418 and a resistor 420 connected between the 5VFP signal and ground. The VBAT signal is filtered by a series of capacitors 422a, 422b, 422c and 422d, connected between the VBAT signal and ground.

To allow the power supply controller 106' to operate correctly, the VBAT signal powers several of the discrete devices, including hysteresis inverters 448, 450, 456, 460, 464, and AND gates 438, 458, 462, and 466. Furthermore, the VBAT signal is provided to the VCC input of a JK-type flip-flop 430, which essentially performs a similar function as the D flip-flop 300, shown in FIG. 3. The VBAT signal is provided to one side of a resistor 424, having its other side connected to the inverted clear input of the JK flip-flop 430. Also, the VBAT signal is provided to one end of a resistor 426, having its other end connected to one side of a capacitor 428 and to the inverted preset input of the JK flip-flop 430. The other side of the capacitor 428 is connected to ground. In this manner, the JK flip-flop is preset when the VBAT signal is initially asserted high, since the inverted clear input is pulled high immediately, while the preset input is only asserted high after the capacitor 428 is charged through the resistor 426.

The Q output of the JK flip-flop 430 provides a signal PWR_ON* at its Q output, which is provided to one input of the AND gate 466, having its output providing the ON* signal to a power supply connector 470. A pullup resistor 468 is provided between the 5VFP and ON* signals. Thus, the 5VFP signal negates the ON* signal high through the resistor 468 when the output of the AND gate 466 is not asserted low, turning the power supply 102 off as a default. However, when the PWR_ON* signal is asserted low by the JK flip-flop 430, the AND gate 466 asserts the ON* signal low, to turn on the power supply 102. The 5VFP signal is provided to the other input of the AND gate 466 and to one side of a resistor 472, having its other side connected to ground. The resistor 472 serves to keep the ON* signal pulled low when the 5VFP signal is not available to conserve power and avoid significant draining of the battery 108. Otherwise, if the 5VFP signal is available, the ON* signal follows the PWR_ON* signal. The ON* signal is analogous to the SPWROUT* signal of FIG. 1.

The 5VFP signal is connected to the cathode of a diode 432 and to one side of resistor 434, where the anode of the diode 432 and the other side of the resistor 434 are connected to one side of a capacitor 436 and to both the J and K inputs of the JK flip-flop 430. The other side of the capacitor 436 is connected to ground. In this manner, when the 5VFP signal is asserted high indicating the presence of voltage from the AC source 100, the JK flip-flop 430 is toggled upon every successive assertion of its inverted CLK input. However, when the 5VFP signal is negated low indicating the absence of the AC source 100, the JK flip-flop 430 remains in its last state, as long as it is powered through the VBAT signal. Upon initial assertion of the 5VFP signal, the capacitor 436 charges through the resistor 434 to provide a smooth rising voltage for the J and K inputs of the JK flip-flop 430. However, if the 5VFP signal is pulled low, the diode 432 pulls the voltage of the capacitor 436 low relatively quickly to prevent spurious conditions of the JK flip-flop 430.

The inverted CLK input of the JK flip-flop 430 receives a signal ON-OFF*, which is provided from the output of a two-input AND gate 438. The logic of the AND gate 438 will now be described. A momentary SPST power switch 439, similar to the switch 110 shown in FIG. 1, provides a signal SW_ON*, which is analogous to the PS_ON* signal shown in FIG. 1. The SW_ON* signal is provided to one side of a pullup resistor 440, having its other side providing a signal DB_SW*, which is connected to one side each of two capacitors 442 and 444 and to one side of a resistor 446. The other sides of the capacitors 442 and 444 are connected to ground, whereas the other side of the resistor 446 is connected to the 5VFP signal. In this manner, the power switch 439 is debounced through the action of the resistor 440 and the capacitors 442 and 444, whereas the resistor 446 serves to pull up the SW_ON* signal while the power switch 439 is not being pressed. Also, if the 5VFP signal goes low, the SW_ON* signal is also pulled low. It should be understand that the SW_ON* signal could also be designed to operate as active high.

The DB_SW* signal is provided to the input of the inverter 448 providing its output to the input of the inverter 450, which provides a signal DBSW_ON* to one input of the AND gate 438. In this manner, a user pressing the power switch 439 grounds the SW_ON*, the DB_SW*, and the DBSW_ON* signals, thereby pulling the ON_OFF* signal low and clocking the JK flip-flop 430. When clocked, the JK flip-flop 430 turns on the power supply 102 if it is off, and turns off the power supply 102 if it is on. Of course, this correspondingly turns on and off the computer 104.

A signal P77_WR* is asserted low upon a write to port 77 of the computer 104. The P77_WR* signal is provided to the input of an inverter 452, having its output connected to one input of a two-input AND gate 454. The other input of the AND gate 454 receives a signal PWRDOWN and the output of the AND gate 454 provides a signal PWRDWN_WP. The PWRDWN_WP signal is provided to one side of a pull-down resistor 455 and to the input of the inverter 456. The other side of the resistor 455 is connected to ground and the output of the inverter 456 is provided to one input of the AND gate 458. The output of the AND gate 458 provides a signal SYSON_OFF* to the other input of the AND gate 438. In this manner, the PWRDWN_WP signal is normally pulled low through the resistor 455, but is asserted high when the computer 104 asserts the PWRDOWN signal high and a write occurs to port 77. In this condition, the PWRDWN_WP signal is asserted high, thereby asserting the SYSON_OFF* signal low and toggling the JK flip-flop 430. This function is similar to the computer 104 asserting the SPOFF signal high to turn off the power supply 102 and the computer 104 through software. Assertion of the PWRDOWN signal combined with a write to port 77 assures that the computer 104 is not shut down due to spurious noise.

An RTC 459, similar to the RTC 116, provides an interrupt request signal IRQ8* to the input of the inverter 460, having its output provided to one input of the AND gate 462. The other input of the AND gate receives the ON* signal. The output of the AND gate 462 provides a signal WAKEUP, which is provided to the input of the inverter 464, having its output provided to the other input of the AND gate 458. The IRQ8* signal is similar to the RTC ALARM signal and is asserted low when the RTC 459 needs to turn on the computer 104. Thus, while the ON* signal is negated high indicating the power supply 102 is off, and if the IRQ8* signal is asserted low indicating an alarm condition, the WAKEUP signal is asserted high and the SYSON_OFF* is asserted low, thereby clocking the JK flip-flop 430 and turning on the power supply 102.

The power supply controller 106' operates in a similar manner as the power supply controller 106, where the JK flip-flop 430 controls the power state of the power supply 102 through the ON* signal. Furthermore, if the power supply 102 is receiving voltage from the AC source 100 and powered on, and the voltage of the AC source 100 is temporarily interrupted, the 5VFP signal is negated low and the lithium battery 407 (or an alkaline battery) continues to provide power to the power supply controller 106'. Thus, the JK flip-flop 430 remains powered, but its state does not change since the J and K inputs are both asserted low. Thus, whether the power supply 102 is turned on or turned off, when the voltage from the AC source 100 is interrupted, the power status of the power supply 102 remains unchanged after voltage from the AC source 100 is next available.

Figure 5:
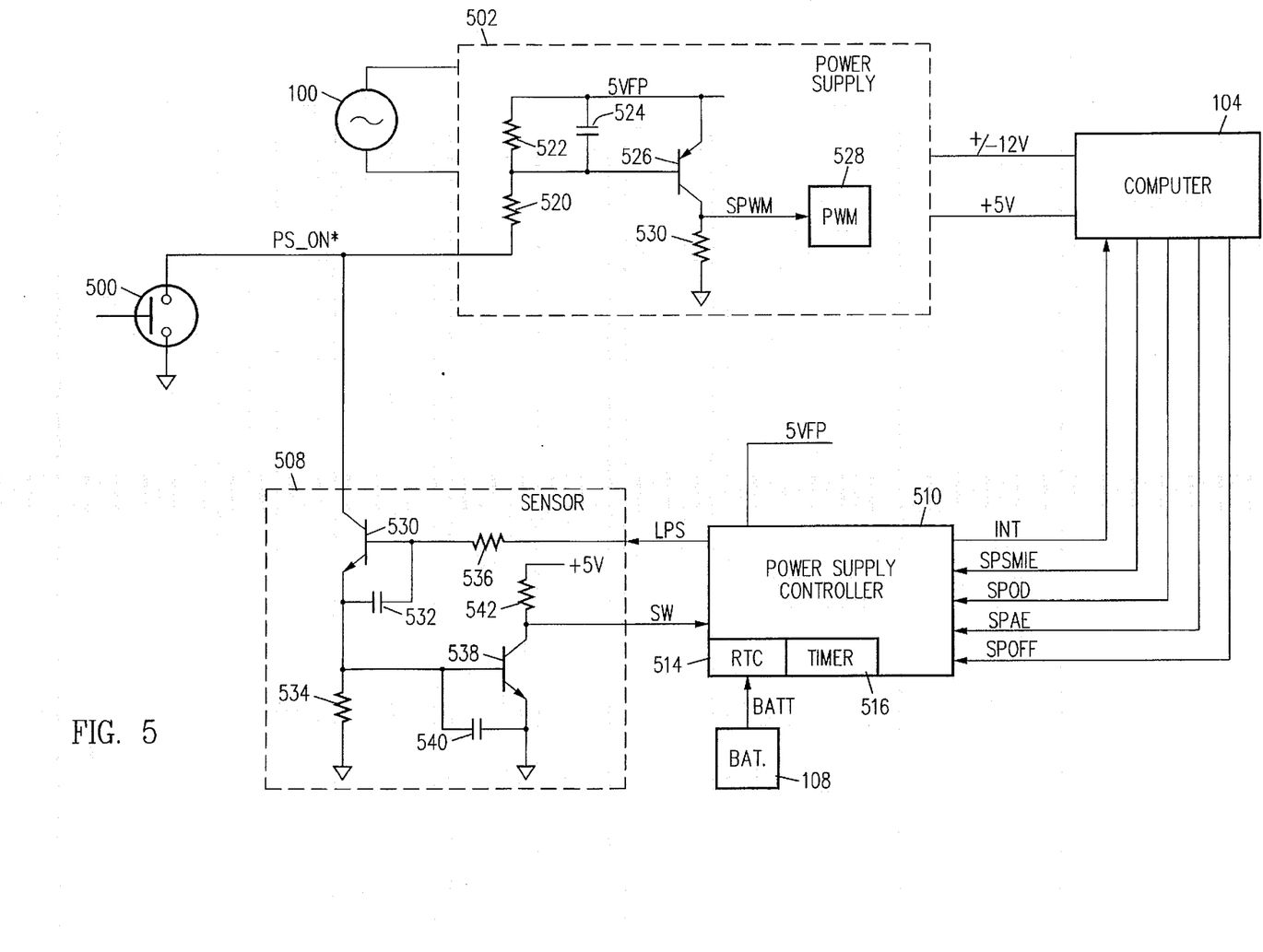
FIG. 5 is a schematic diagram of an alternative embodiment of the present invention.

Referring now to FIG. 5, a schematic and block diagram is shown of an alternative embodiment incorporating the last state status apparatus according to the present invention. Again, the AC source 100, the computer 104 and the battery 108 are connected and operate in a similar manner. A power switch 500, which is preferably a normally open momentary SPST switch, is coupled to ground and provides a signal PS_ON* to a power supply 502. The power supply 502 receives primary power from the AC source 100, and provides a series of output voltages, such as +5V, +12V, and -12V, to the computer 104, as described previously. Again, of course, the computer 104 can be any electronic device requiring use of the last power state bit according to the present invention. The PS_ON* signal is also provided to a sensor circuit 508 for sensing anytime the user presses the power switch 500 and for latching the PS_ON* signal. The sensor circuit 508 receives a signal LPS and provides a signal SW to a power supply controller 510. The power supply controller 510 asserts the LPS signal to indicate the desired power status of the power supply 502, and the SW signal is asserted to indicate that the power switch 500 has been pressed. In a similar manner as described previously, the power supply controller 510 receives the 5VFP signal developed by the power supply 502 and also receives a signal BATT from the battery 108, which is preferably a lithium or alkaline battery. Furthermore, the power supply controller 510 includes an RTC 514 and a timer 516, if desired. Likewise, the computer 104 preferably provides the SPSMIE, SPOD, SPAE, and SPOFF signals, which operate in a similar manner as described for FIG. 1. Furthermore, the external interrupt signal INT is provided to the computer 104 from the power supply controller 510.

The PS_ON* signal is provided to one side of a resistor 520 within the power supply 502, where the other side of the resistor 520 is connected to one side of a resistor 522, to one side of a capacitor 524 and to the base of a PNP bipolar transistor 526. The transistor 526 is preferably a 2N2907 type transistor or equivalent. The other sides of the resistor 522 and the capacitor 524 and the emitter of the transistor 526 are connected to the 5VFP signal, and the collector of the transistor 526 provides a signal SPWM which is connected to one side of a resistor 530. The other side of the resistor 530 is connected to ground. The capacitor 524 provides RF (radio frequency) filtering. The resistors 520, 522, and 530 are chosen to bias the transistor 526 on when the PS_ON* signal is asserted low, so that the SPWM signal is correspondingly pulled to the 5VFP signal, or otherwise asserted high. The SPWM signal is connected to an internal pulse width modulation (PWM) control circuit 528 within the power supply 502 for controlling operation of the power supply 502. In particular, when the SPWM signal is asserted high, the PWM 528 operates so that the power supply 502 is turned on. Otherwise, if the SPWM signal is pulled low, the power supply 502 is turned off. If the PS_ON* signal is left open circuited, it is pulled high through the resistors 520 and 522 by the 5VFP signal, thereby turning off the transistor 526. The SPWM signal is consequently pulled low through resistor 530, so that the power supply 502 is turned off.

The PS_ON* signal is provided to the collector of an NPN bipolar transistor 530, within a sensor circuit 508, where the transistor 530 is preferably a 2N2222 type transistor or equivalent. The emitter of the transistor 530 is connected to one side of a resistor 534 and to the base of another NPN bipolar transistor 538, which is also preferably a 2N2222 type transistor or equivalent. The other side of the resistor 534 and the emitter of the transistor 538 are connected to ground. A filter capacitor 532 is connected between the base and emitter of the transistor 530, and a filter capacitor 540 is preferably connected between the base and emitter of the transistor 538 for RF filtering purposes. The base of the transistor 530 is connected to one side of a resistor 536, having its other side receiving the LPS signal from the power supply controller 510. The collector of the transistor 538 is connected to one side of a resistor 542 and provides the SW signal to the power supply controller 510. The other side of the resistor 542 is connected to the +5V signal provided from the power supply 502. The power supply controller 510 includes a memory bit and the appropriate switching logic (not shown) as described previously.

Operation of the sensor circuit 508 is as follows. When the LPS signal is asserted high by the power supply controller 510, the power supply 502 is on if voltage is provided from the AC source 100. This biases the transistor 530 on, thereby pulling the PS_ON* signal low, or to a logic low level. However, enough voltage develops across the resistor 534 to activate the transistor 538, so that the SW signal is pulled low. When a user presses the power switch 500, the PS_ON* signal is pulled all the way to ground, thereby turning off the transistor 538, so that the SW signal is pulled high by the +5V signal through the resistor 542. The power supply controller 510 detects the SW signal asserted high and monitors the SPSMIE and SPOD signals in a similar manner as described previously, to determine whether to shut down the computer 504. If so, the power supply controller 510 asserts the LPS signal low thereby turning off the transistor 530. The PS_ON* signal is thus open-circuited, so that once the power switch 500 is released by the user, the PS_ON* signal is pulled high by the 5VFP signal. The transistor 526 is consequently turned off, so that the SPWM signal is pulled low and the power supply 502 is turned off.

If the power supply 502 is turned off, voltage is available from the AC source 100, and the user presses the power switch 500, the transistor 526 is activated, thereby pulling the SPWM signal high and turning on the power supply 502. The power supply 502 asserts the +5V signal, pulling the SW signal high through the resistor 542, which is detected by the power supply controller 510. The power supply controller 510 correspondingly asserts the LPS signal high, thereby latching the PS_ON* signal low by turning on the transistor 530. If the power supply 502 is on and voltage from the AC source 100 is temporarily interrupted, the power supply 502 is shut down, but the power supply controller 510 continues to assert the LPS signal. When voltage is next available from the AC source 100, the transistor 530 is activated, pulling the PS_ON* signal low and turning on the transistor 526 to pull the SPWM signal high. This turns on the power supply 502, which subsequently turns on the computer 104. Thus, the power supply controller 510 and the sensor circuit 508 performs similar functions as the power supply controllers 106 and 106' described previously. One slight variation is that the power switch 500 directly manipulates the power status signal, performed by the PS_ON* signal.

It can now be appreciated that the last state power apparatus according to the present invention provides a battery-backed memory bit to remember the power status of an electronic device in the event of temporary power loss from a primary power source. Once primary power is next available, the memory bit is used to reactivate the power supply and thereby turn back on the electronic device automatically without the necessity of user intervention. This is particularly advantageous for computers used as server systems, where the computer is automatically reactivated once power is next available. Furthermore, a momentary push button type switch may be used as a power switch, which removes the need for a toggle type power switch typically used on electronic devices, such as computer systems. The use of the momentary power switch further enables the ability to turn on and off the electronic device through other means, such as software, and also to prevent prematurely turning off the computer system in the event vital operations are being performed.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A last power state apparatus for controlling the power state of an electronic device, wherein the electronic device ultimately receives power from a primary power source, said last power state apparatus comprising:

a power supply for coupling to the electronic device and for converting the voltage from the primary power source to the appropriate voltage levels for the electronic device, said power supply receiving a power status signal indicative of the power state of the electronic device and for correspondingly turning on and off said power supply and the electronic device;

a memory having an on and an off state and an output for continuously providing to the power supply said power status signal indicative thereof;

a battery coupled to said memory for providing power to maintain the state of said memory;

a power switch for manually turning on and off the electronic device; and a switch circuit coupled to said memory and said power switch for detecting the assertion of said power switch and for changing the state of said memory, wherein said change of state of said memory affects said power status signal.

2. The last power state apparatus of claim 1, wherein said battery is a lithium type battery.

3. The last power state apparatus of claim 1, wherein the primary power source provides an AC voltage, and wherein said power supply converts said AC voltage to DC voltage signals.

4. The last power state apparatus of claim 1, wherein said power switch comprises a momentary switch.

5. The last power state apparatus of claim 1, further comprising:

said power supply including means for providing a flea power signal when the primary power source is providing voltage to said power supply; and means coupled to said battery and receiving said flea power signal for providing a power signal to said memory, wherein said power signal providing means provides power from said flea power signal if provided, but otherwise provides power from said battery.

6. The last power state apparatus of claim 5, wherein said power signal providing means comprises:

a first diode having an anode receiving said flea power signal and a cathode;

a second diode having an anode connected to said battery and a cathode; and wherein the cathodes of said first and second diodes are coupled together for providing said power signal.

7. The last power state apparatus of claim 1, further comprising:

a circuit coupled to said battery for asserting a battery valid signal when the voltage of said battery is above a predetermined low level, but otherwise negating said battery valid signal; and said switch circuit including means for receiving said battery valid signal, wherein said receiving means changes the state of said memory to off if said battery valid signal is negated.

8. The last power state apparatus of claim 1, wherein said switch circuit further comprises:

means for receiving an off signal from the electronic device to turn off the electronic device, wherein said switch circuit changes the state of said memory to off when said off signal is asserted by the electronic device.

9. The last power state apparatus of claim 1, further comprising:

the electronic device including means for asserting an interrupt enable signal, means for receiving an interrupt signal indicative of turning off the electronic device and means for generating a disable signal in response to said interrupt signal for preventing the electronic device from being turned off; and said switch circuit including means for receiving said interrupt enable signal and for providing said interrupt signal upon the assertion of said power switch if said interrupt enable signal is asserted and means for receiving said disable signal, wherein said switch circuit detects the assertion of said power switch and changes the state of said memory if said interrupt enable signal is not asserted or if said interrupt enable signal is asserted and the electronic device does not assert said disable signal within a predetermined period of time after said interrupt signal is asserted.

10. The last power state apparatus of claim 1, further comprising:

a real time clock coupled to said battery and said switch circuit for asserting an alarm signal; and said switch circuit including means for detecting said alarm signal and changing the state of said memory to on if said alarm signal is asserted.

11. The last power state apparatus of claim 10, wherein said switch circuit further comprises:

an alarm enable bit;

means coupled to said alarm enable bit for receiving an alarm enable signal from the electronic device and for correspondingly setting said alarm enable bit; and means coupled to said alarm enable bit for changing the state of said memory to on if said alarm enable bit is set and said alarm signal is asserted.

12. The last power state apparatus of claim 1, wherein said memory comprises a D flip-flop.

13. The last power state apparatus of claim 12, wherein said D flip-flop includes a clock input and is configured to assert said power status signal to indicate that said power supply is on after said D flip-flop is clocked.

14. The last power state apparatus of claim 13, wherein said switch circuit further comprises:

means for receiving an activation signal, wherein said switch circuit clocks said D flip-flop upon the assertion of said activation signal.

15. The last power state apparatus of claim 13, wherein said switch circuit clocks said D flip-flop if the state of said memory is off and said power switch is asserted.

16. The last power state apparatus of claim 15, wherein said power supply further includes:

means for providing a flea power signal when the primary power source is providing voltage to said power supply; and wherein said switch circuit asserts said clock input of said D flip-flop when the state of said memory is off, said flea power signal is provided and said power switch is asserted.

17. The last power state apparatus of claim 13, wherein said D flip-flop includes a clear input and asserts said power status signal to indicate said power supply is off when said clear input is asserted.

18. The last power state apparatus of claim 17, wherein said switch circuit asserts said clear input of said D flip-flop if the state of said memory is on and said power switch is asserted.

19. The last power state apparatus of claim 18, wherein said power supply further includes:

means for providing a flea power signal when the primary power source is providing voltage to said power supply; and wherein said switch circuit asserts said clear input of said D flip flop when the state of said memory is off, said flea power signal is provided and said power switch is asserted.

20. The last power state apparatus of claim 17 wherein the electronic device provides an off signal to turn off said power supply, wherein said switch circuit further comprises:

means for detecting said off signal and for asserting said clear input of said D flip-flop if said off signal is asserted.

21. The last power state apparatus of claim 17, further comprising:

a circuit coupled to said battery for asserting a battery valid signal when the voltage of said battery is above a predetermined low level, but otherwise negating said battery valid signal; and said switch circuit including means for receiving said battery valid signal, wherein said switch circuit receiving means changes the state of said memory to off if said battery valid signal is negated.

22. The last power state apparatus of claim 1, wherein said memory comprises a JK type flip-flop having an output providing said power status signal.

23. The last power state apparatus of claim 22, further comprising:

said power supply including means for providing a flea power signal when the primary power source is providing voltage to said power supply; and said JK flip-flop including a clock input and receiving said flea power signal at its J and K inputs, wherein said JK flip-flop is toggled upon the assertion of said clock input if said flea power signal is provided, and wherein the state of said JK flip-flop remains static if said flea power signal is not provided.

24. The last power state apparatus of claim 23, wherein said switch circuit asserts said clock input of said JK flip-flop upon the assertion of said power switch.

25. The last power state apparatus of claim 23, wherein the electronic device asserts an off signal to turn the electronic device off, said switch circuit further comprising:

means for receiving said off signal and for correspondingly asserting said clock signal if said off signal is asserted.

26. The last power state apparatus of claim 23, further comprising:

a real time clock coupled to said switch circuit for asserting an alarm signal; and wherein said switch circuit includes means for receiving said alarm signal and for asserting said clock input of said JK flip-flop if said alarm signal is asserted.

27. The last power state apparatus of claim 1, wherein said power supply includes a pulse width modulation circuit, wherein said power supply is turned off when said pulse width modulation circuit is disabled, and wherein said power supply is turned on when said pulse width modulation circuit is enabled.

28. A last power state apparatus for controlling the power state of an electronic device, wherein the electronic device ultimately receives power from a primary power source, said last power state apparatus comprising:

a power supply for coupling to the electronic device and for converting the voltage from the primary power source to the appropriate voltage levels for the electronic device, said power supply comprising:

means for providing an output power signal indicative of said power supply being powered on;

means for providing a flea power signal when the primary power source is providing voltage to said power supply; and means receiving a power on signal for activating said power supply while said power on signal is asserted;

a battery;

a momentary power switch for asserting an on request signal while said momentary power switch is pressed; and a switch circuit coupled to said battery, said power switch and said power supply, said switch circuit comprising:

a memory coupled to said battery and said flea power signal, and having an on and an off state and providing said power on signal;

means coupled to said memory and said power switch for asserting said on request signal if said memory is in the on state;

means coupled to said on request signal asserting means, said power switch and receiving said output power signal for detecting said power switch being pressed while said on request signal is asserted and for detecting said output power signal being provided from said power supply and for asserting a switch signal indicative thereof, and means coupled to said memory and receiving said switch signal for changing the state of said memory if said switch signal is asserted, wherein said change of state of said memory affects said power on signal.

29. The last power state apparatus of claim 28, wherein said power supply power on signal asserting means, said switch circuit on request signal asserting means and said switch circuit detecting means comprise bipolar transistor circuits.

* * * * *